US011625848B2

(12) United States Patent
Gimpelson

(10) Patent No.: US 11,625,848 B2
(45) Date of Patent: *Apr. 11, 2023

(54) APPARATUS FOR MULTI-ANGLE SCREEN COVERAGE ANALYSIS

(71) Applicant: UNITY TECHNOLOGIES SF

(72) Inventor: Kenneth Gimpelson, Wellington (NZ)

(73) Assignee: UNITY TECHNOLOGIES SF, San Francisco, CA (US)

(*) Notice: Subject to any disclaimer, the term of this patent is extended or adjusted under 35 U.S.C. 154(b) by 139 days.

This patent is subject to a terminal disclaimer.

(21) Appl. No.: 17/071,940

(22) Filed: Oct. 15, 2020

(65) Prior Publication Data

US 2021/0241485 A1 Aug. 5, 2021

Related U.S. Application Data

(60) Provisional application No. 62/968,047, filed on Jan. 30, 2020.

(51) Int. Cl.
*G06T 7/70* (2017.01)
*G06T 7/50* (2017.01)
*G06T 7/00* (2017.01)

(52) U.S. Cl.
CPC ............. *G06T 7/70* (2017.01); *G06T 7/0002* (2013.01); *G06T 7/50* (2017.01); *G06T 2207/30168* (2013.01)

(58) Field of Classification Search
CPC .................. G06F 16/957; G06T 15/10; G06T 2207/30168; G06T 2210/12; G06T 7/0002; G06T 7/50; G06T 7/70; G06T 15/04; G06T 15/08; G06T 13/40; G06T 13/80; G06T 9/001; G06T 2210/36; G06T 2207/20172; G06T 11/00; G06T 15/205; G06T 15/005; G06K 9/00315; G06K 9/469; G06K 9/627
See application file for complete search history.

(56) References Cited

U.S. PATENT DOCUMENTS

| | | | | |
|---|---|---|---|---|
| 6,118,456 A * | 9/2000 | Cooper | ................... | G06T 15/40 345/619 |
| 6,587,109 B1 * | 7/2003 | Rose | ....................... | G06T 13/20 345/428 |
| 6,674,437 B1 * | 1/2004 | Rose | ....................... | G06T 13/20 345/473 |
| 7,525,543 B2 * | 4/2009 | Engel | ...................... | G06T 15/08 345/422 |
| 7,733,354 B1 * | 6/2010 | Meeh | ..................... | G06T 15/503 345/428 |
| 8,035,636 B1 * | 10/2011 | Yang | ....................... | G06T 15/00 345/473 |
| 9,077,891 B1 * | 7/2015 | Baldwin | ................... | G06T 7/50 |
| 9,852,539 B2 * | 12/2017 | Nguyen | ................. | G06T 15/08 |

(Continued)

*Primary Examiner* — Ian L Lemieux
(74) *Attorney, Agent, or Firm* — Trellis IP Law Group, PC

(57) ABSTRACT

Embodiments provide multi-angle screen coverage analysis. In some embodiments, a system obtains a computer graphics generated image having at least one target object for analysis. The system determines screen coverage information and depth information for the at least one target object. The system then determines an asset detail level for the at least one target object based on the screen coverage information and the depth information. The system then stores the asset detail level in a database, and makes the asset detail level available to users.

19 Claims, 5 Drawing Sheets

(56) References Cited

U.S. PATENT DOCUMENTS

| | | | | |
|---|---|---|---|---|
| 10,026,224 | B2* | 7/2018 | Bell | G06T 17/20 |
| 11,113,880 | B1* | 9/2021 | LaFayette | G06T 17/205 |
| 11,270,497 | B2* | 3/2022 | Wei | G06T 1/60 |
| 2005/0253872 | A1* | 11/2005 | Goss | G06T 15/30 |
| | | | | 345/660 |
| 2006/0061584 | A1* | 3/2006 | Kristiansen | G06T 15/04 |
| | | | | 345/582 |
| 2008/0074415 | A1* | 3/2008 | Woo | G06T 15/005 |
| | | | | 345/419 |
| 2012/0206452 | A1* | 8/2012 | Geisner | G06V 10/26 |
| | | | | 345/419 |
| 2014/0198097 | A1* | 7/2014 | Evans | G06T 17/00 |
| | | | | 345/419 |
| 2015/0161760 | A1* | 6/2015 | Nordstoga | G06T 17/05 |
| | | | | 345/541 |
| 2015/0178976 | A1* | 6/2015 | Strauss | G06T 15/08 |
| | | | | 345/420 |
| 2015/0262421 | A1* | 9/2015 | Bell | G06T 3/40 |
| | | | | 345/423 |
| 2017/0060901 | A1* | 3/2017 | Kristiansen | G06F 16/2455 |
| 2017/0249772 | A1* | 8/2017 | Belanger | G06T 15/005 |
| 2017/0358132 | A1* | 12/2017 | Munshi | G06T 15/80 |
| 2018/0275410 | A1* | 9/2018 | Yeoh | H04N 13/398 |
| 2019/0080512 | A1* | 3/2019 | Johansson | G06T 17/205 |
| 2019/0192970 | A1* | 6/2019 | Garbut | A63F 13/57 |
| 2019/0192972 | A1* | 6/2019 | Garbut | G06T 13/40 |
| 2020/0402294 | A1* | 12/2020 | Yerli | G06T 15/08 |
| 2021/0090333 | A1* | 3/2021 | Ravasz | G02B 27/01 |

* cited by examiner

US 11,625,848 B2

APPARATUS FOR MULTI-ANGLE SCREEN COVERAGE ANALYSIS

CROSS-REFERENCE TO RELATED APPLICATIONS

This application claims priority from U.S. Provisional Patent Application No. 62/968,047, entitled "APPARATUS FOR MULTI-ANGLE SCREEN COVERAGE ANALYSIS," filed Jan. 30, 2020, which is hereby incorporated by reference as if set forth in full in this application for all purposes.

BACKGROUND

During visual productions such as movies, videos, etc., conventional industry solutions include finalizing layouts and cameras before commencing construction of objects used in digital images. Such construction may involve animation and/or lighting work, for example. Waiting for final layouts and cameras can lead to overall delays in a visual production. One approach is to build new and unique objects and sets for each shot. That would deliver the most appropriate build-quality in that shot. However, the cost is the inability to capitalize on that effort by reusing the objects in other shots. A second approach is to build all objects to highest-possible quality. However, this risks expending wasted effort during asset creation that will make no impact on the final images. Or, worse yet, it risks negatively impacting a system's ability to create images on a technical front by wasting processing time and memory. This may be mitigated by building multiple versions of an object (LOD, or level-of-detail) so that a system may select a version and optimize time and/or memory. However, that approach still requires expending the maximum effort to create the most detailed version, even if lesser versions are derived procedurally.

SUMMARY

Embodiments generally relate to multi-angle screen coverage analysis. In various embodiments, instead of culling a fully built animation scene with the highest detail level, a system determines what asset detail level is needed for particular objects in a scene for animators and informs the animators in advance and over the course of a visual production. In some embodiments, a system obtains at least one image, where the image is a computer graphics generated image, where the image comprises multiple objects, and where the objects include the at least one target object. The system then determines screen coverage information for the target object, where the screen coverage information is based on a percentage of the screen that is covered by the target object. The system also determines depth information for the target object, where the depth information for the target object is based on at least one other object. The system then determines an asset detail level for the target object based on the screen coverage information and the depth information, and stores the asset detail level in a database.

DETAILED DESCRIPTION OF EMBODIMENTS

Embodiments provide multi-angle screen coverage analysis. In some embodiments, a system obtains a computer graphics generated image having at least one target object for analysis. The system determines screen coverage information and depth information for the target object. In various embodiments, the depth information may include the distance between the target object and given camera. The system then determines an asset detail level for the target object based on the screen coverage information and the depth information. The system then stores the asset detail level in a database, and makes the asset detail level available to users. The terms asset and target object may be used interchangeably.

In contrast to conventional solutions, the system does not build new and unique 3-dimensional (3D) sets for each shot in a visual production such as a movie. Instead, as described in more detail herein, in various embodiments, the system builds a master layout with assets or objects having flexible asset detail levels. The system may reuse a given target object or collection of target objects across multiple shots of the visual production.

Using a master layout is technically advantageous, because it is more efficient for the system to process one master layout and target objects with appropriate asset detail levels, as opposed to processing multiple sets with objects of high asset detail levels. In other words, embodiments described herein reduce processing requirements of the system. For example, in some scenarios, a given target object may appear close to the camera. As such, higher asset detail level is appropriate. In some scenarios, a given target object may appear to be in the distant background relative to the camera. As such, lower asset detail level is appropriate. The particular asset detail level may vary, depending on the particular implementation.

Using a master layout with flexible asset detail levels of one or more target objects is also technically advantageous, because it reduces processing requirements of other visual production systems (e.g., systems involving animation, lighting, etc.). These processing requirements may involve memory, processor power, and time. Furthermore, these other visual production systems need not wait until work on the layout and camera work is finalized. This shortens the overall visual production, which reduces production costs.

Figure 1:
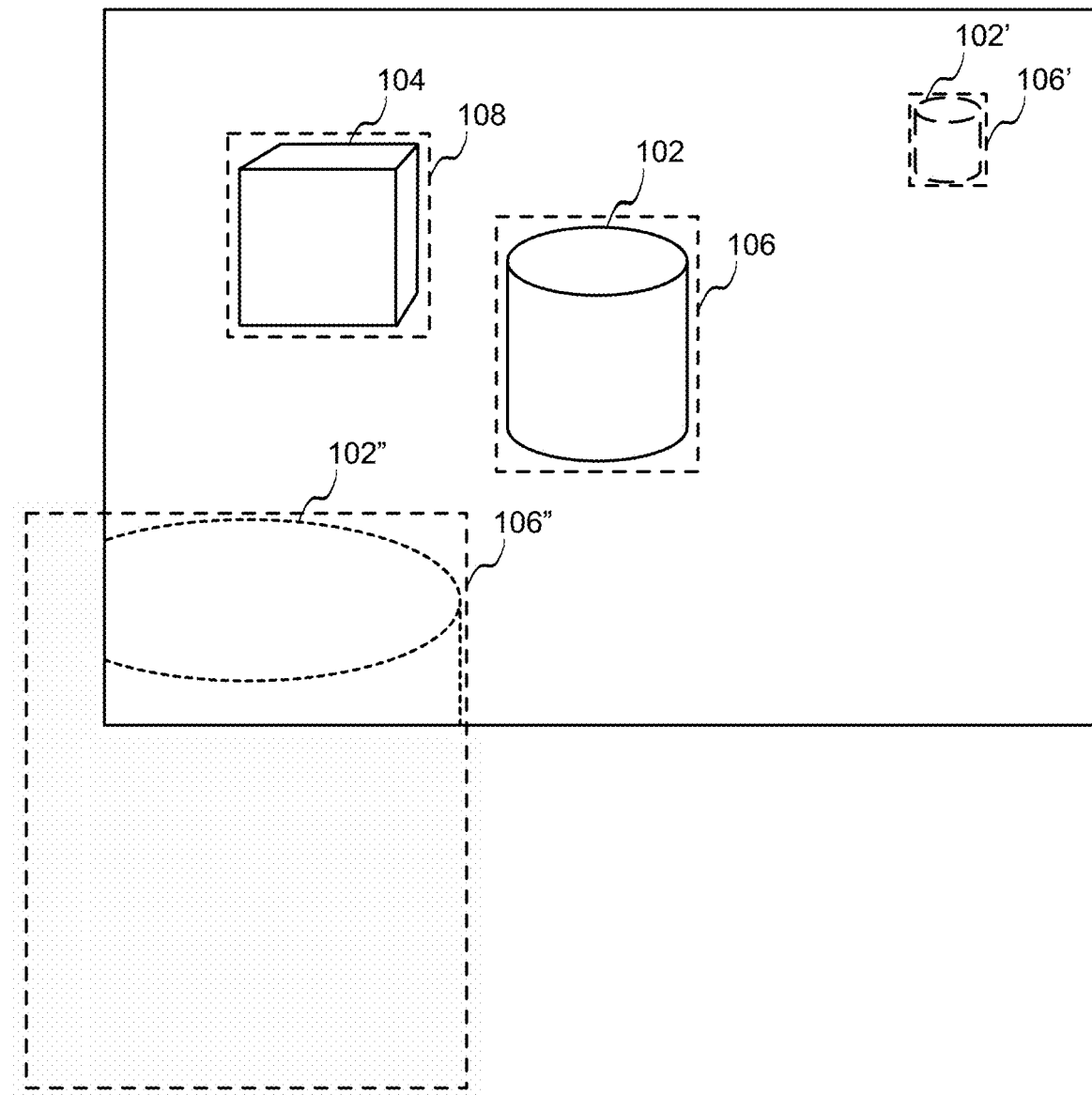
FIG. 1 is a block diagram of an example a computer graphics generated image, which may be used for embodiments described herein.

FIG. 1 is a block diagram of an example a computer graphics generated image 100, which may be used for embodiments described herein. Shown is a target object 102 and another object 104 in a scene or shot captured in the image 100. For ease of illustration, embodiments described herein are described in the context of target object 102. These embodiments may also apply to object 104 if deemed a target object.

Image 100 may be an image for any given visual production (e.g., movie production, video production, etc.). In this example, target object 102 is a barrel. While some embodiments are described in the context of a barrel, the target object may be any type of object (e.g., car, tree, building, monster, etc.).

In various embodiments, the processing described herein regarding objects in an image may be performed on any suitable type of image. In some embodiments, an image may include a photo, a visual image, a derived image such as an object ID pass, etc. In various embodiments, for example, an image may be of the type variously referred to as an "object ID," an "object ID pass," a "render ID," a "material ID," etc., and may be associated with various categories of "color maps." In various embodiments, these images reduce different object models or materials in a scene to corresponding flat-colored "masks." In various embodiments, one or more masks in a scene may be subjected to one or more of the steps described herein to arrive at a suggested detail level for rendering the object corresponding to the object ID represented by the mask.

As shown, target object 102 is substantially in the middle of the image and is shown next to another object 104 to provide some perspective. Depending on the particular shot, in some scenarios, target object 102 may be in the distant background of the image as indicted by 102'. In other scenarios, target object 102 may be closer in the foreground of the image as indicted by 102".

For ease of illustration, embodiments are described herein in the context of a single target object 102. These embodiments also apply to multiple target objects. There may be scenarios where the target object variations 102, 102', and 102" shown are three different barrels used in the same frame of image 100. For example, there may be three barrels in a given image, where one barrel is close, one barrel is farther in the distance, and one barrel is in the far distance.

In various embodiments, the system analyses the same asset or target object from multiple different camera angles and distances yielding a representative sample of the expected appearance of that asset throughout the production. In various embodiments, the system analyzes combined samples to determine an asset detail level that artists should target when generating components of the asset (e.g., geometry, textures, etc.), thus knowing how that asset will used throughout the production.

In various embodiments, the asset detail level may include an amount of image detail. In various embodiments, the asset detail level may include image resolution. In various embodiments, the asset detail level may be defined in an absolute way. For example, the asset detail level may be expressed as a size-on-screen using a pixel count by area or dimension. In various embodiments, this count may be rounded or approximated in order to categorize the object's detail level into an abstraction more useful for human interaction, communication, and selection (e.g., "256," "512," "1 k," "2 k," 4 k," etc.).

In various embodiments, the asset detail level may be defined in a relative way. For example, the asset detail level may be expressed as a percentage or fractional size of the final image size. In various embodiments, the asset detail level may be defined in an abstract way. For example, the asset detail level may be expressed as "low," "medium," "high," etc. In various embodiments, the asset detail level is expressed to artists, technicians, and managers who have a shared understanding of those terms through external experience, policy, documentation, nomenclature, etc.

In various embodiments, the asset detail level is one consideration that informs the artists, technicians, and managers how they may apply their craft. The exact implementation of a given asset to a given asset detail level specification may vary based on additional expertise and context known to those artists, technicians, and managers. For example, for a given asset detail level, one asset may be required to achieve its detail from geometric density with little or no texture density whereas the opposite may be true for a second asset.

Furthermore, in various embodiments, the asset detail level may include consideration of depth, screen space coverage, visibility, motion blur, lens blur, texture, texture resolution, native resolution of an asset, pixel density, texture density, model density, etc. The asset detail level may influence how much detail (e.g., texture, etc.) is visible in a given image. This influences the amount of computation resources as well as the amount of human resources to allocate to creating assets during production.

Also shown is a 2D bounding box 106. In various embodiments, the system generates 2D bounding box 106 such that it closely surrounds target object 102. As such, 2D bounding box 106 approximates the size of target object 102 for subsequent processing.

In various embodiments, the system generates a 2D bounding box for each target object in an image. For example, in the scenario where image 100 also includes target objects 102' and 102", the system would also generate 2D bounding boxes 106' and 106" for respective target objects 102' and 102". Similarly, in some embodiments, if object 104 where a target object, the system generates a 2D bounding box 106 for object 104.

For ease of illustration, while some embodiments are described in the context of a single target object, the system may analyze the visual field of the different target objects in a given image. Example embodiments involving image 100 and its content objects are described in more detail below.

Figure 2:
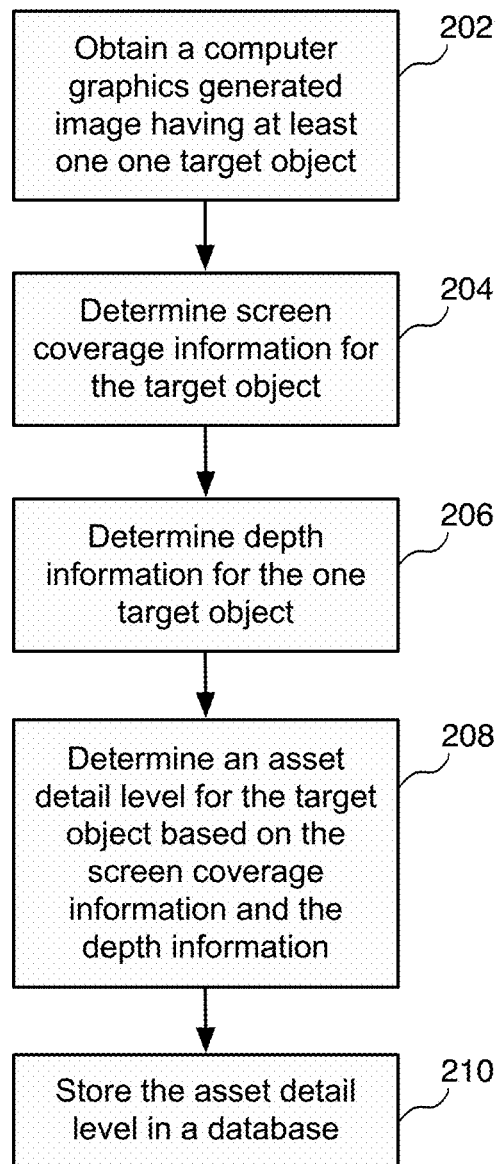
FIG. 2 is an example flow diagram for multi-angle screen coverage analysis, according to some embodiments.

FIG. 2 is an example flow diagram for multi-angle screen coverage analysis, according to some implementations. Referring to both FIGS. 1 and 2, a method is initiated at block 202, where a system obtains at least one image. In various embodiments, the image is a computer graphics generated image that includes the target object or objects. While some embodiments are described herein in the context of a single target object, these embodiments may apply to each target object of multiple target objects or grouped target objects, etc.

In various embodiments, the system obtains the image from stock footage from cameras and may include 3D geometry and camera information. From the stock footage, the system determines the target objects in the image. In various embodiments, the system may run a render and simultaneously use the output of that render for various purposes, depending on the particular implementation.

At block 204, the system determines screen coverage information for the target object. In various embodiments, the target object is at least partially visible in the image. For example, in one scenario, target object 102 is fully visible. In another scenario, target object 102" may be partially visible in the image.

In various embodiments, the screen coverage information is based on a percentage, a ratio, and/or the absolute portion of the screen that is covered by the target object. In various embodiments, the system determines and compares the measurements of each 2D bounding box to the rest of the frame or image 100. The terms frame and image may be used interchangeably. The system may determine a percentage or a ratio of the size of each target object relative to image 100. In various embodiments, the system may utilize a renderer such as open graphics library (OpenGL), etc. to provide ID passes and to determine such measurements, and may utilize other means to perform geometric calculations of object/object and object/camera relationships.

In some embodiments, for each 2D bounding box, the system determines where the 2D bounding box starts and stops on both the x-axis and y-axis, whether a given object is fully visible in the image or partially visible (partially off screen).

In various embodiments, the system provides dimensions of the 2D bounding box relative to a given image. The system determines such relative dimensions for all target objects in the image. In various embodiments, the dimensions for a given 2D bounding box are based on a percentage or ratio of the size of the 2D bounding box compared to the image. The system may subsequently convert these dimensions to absolute pixel sizes need for further processing.

In some embodiments, the system samples pixels in the image in order to determine the screen coverage and depth information for the target images as well as other 3D elements that are visible in the image frame. In some embodiments, the system may determine 3D pixel dimensions based on the longest 2D dimension according to sampled pixels. One of the reasons for running a render, rather than performing a more basic trigonometric analysis, is that the system may require knowledge of the assigned surface materials. This knowledge informs the system when considering objects behind and/or obscured by the current object. In some embodiments, the system does not gather data for objects behind a solid wall, but still gathers data for objects visible through a window in that wall.

In some embodiments, when considering data for objects behind a foreground object such as a solid wall, for example, the system may consider surface materials (which implies a render). For example, in some embodiments, a "window" may be implemented within a "wall" object to be analyzed by making a section of the geometry transparent. This may require surface shading and deformation. In various embodiments, such materials may describe glass or other materials. Alternatively, in some embodiments, a wall object may have a complex topology such as a hole that is cut into the geometry. This may be achieved without shading. Without implying a limitation on the possible methods used to describe an object's shape and material, in some embodiments, the system may use either or both methods within a renderer or other means of analysis to inform the system's results.

At block 206, the system determines depth information for the at least one target object. In various embodiments, the depth information may include the distance between the target object and given camera. In some embodiments, the depth information may affect the detail level of a given target object. For example, if given a target object such as a building, mountain, etc., that is rendered in the far distance, the system may render such an object with lower detail level and/or blurred with less detail, as more detail would not be necessary.

In various embodiments, a given image may have multiple objects, including one or more target objects. The system may determine the depth information for the target object based on one or more of the other objects in the image. For example, the system may determine the depth of target object 102 relative to object 104. In various embodiments, the system may already have depth information of object 104 and size information about object 104 (e.g., dimensions, etc.) stored in a database. In various embodiments, the system may also have a known size and position of object 104 in the particular scene, which may be stored in the database. In various embodiments, the system may also know size information about target object 102 (e.g., dimensions, etc.) stored in the database. In various embodiments, the system may ascertain depth information for target object 102 relative to the known information on object 104 or other objects that may appear in image 100.

At block 208, the system determines an asset detail level for the target object based on the screen coverage information and the depth information. As such, embodiments enable a given view of a target object to significantly change at any point over the course of visual production (e.g., film/movie production, video production, etc.). Embodiments match the effort involved in creating those objects with the manner in which the objects will appear in the final version of the visual production. For example, distant objects may have lower asset detail level, and closer objects have higher asset detail level, etc.

At block 210, the system stores the asset detail level in a database. In various embodiments, the system outputs an asset detail level for target object 102 (and for each target object). In some embodiments, the asset detail level may be a pixel value. For example, if the image frame is 2,000 pixels wide, and the longest length of the 2D bounding box is 1,000 pixels, the pixel resolution may be 1,000 pixels. The system may adjust the asset detail level based on the actual image frame size (2,000 or 2K image, 4,000 or 4K image, etc.).

In various embodiments, the system provides a holistic analysis of shot content over the course of shot production, and provides information from the analysis to other users to inform decisions along the way. In some embodiments, the system may send or provide the asset detail level of target object 102 as well as the asset detail level of other target objects to one or more users. Also, the system makes asset detail level available to various users (e.g., artists, productions managers, etc.) for making decisions based on the desired level of detail of the target objects.

In some embodiments, the system schedules or enables the scheduling of artistic work on the target object or a collection of target objects. As such, down-stream systems of the visual production that consume those target objects may proceed as early as possible, or as desired by production management.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following describes additional embodiments. Embodiments facilitate artists and production managers to make decisions around how much effort to expend on a given object, and when to schedule that effort. This can be used at any point in the production process from previsualization scenes with inexpensive blocking versions of the asset (aka, first-look or stand-in versions) to final or near-final quality versions expected to be in the final images. Tracking this information over the life of the movie production may help highlight unexpected changes or predict the cost of intended changes.

In various embodiments, the system replicates the data set associated with the target object, including the asset detail level across numerous frames (e.g., 200K frames, etc.). The system identifies and tracks each target object across the different frames. In various embodiments, the system tracks the identity of a given target such as target object 102 with a name and identifier (e.g., "Barrel 24"). For example, in some embodiments, the target object may appear in the scene at one moment (e.g., in different frames), leave the scene at a subsequent moment (e.g., leaves the different frames), and then return to the scene in another subsequent moment (e.g., reenters the different frames).

In various embodiments, the system may utilize any suitable renderer to collect screen coverage and depth information for each and every target object, which may include other logical elements in a given image. The system may also serialize the target object and corresponding asset detail level, and store this information in a database. In various embodiments, the system may analyze a selected sample of frames in a given shot to collect reasonably complete data, without rendering each and every frame. This is technically advantageous in that the system processes fewer frames.

In various embodiments, the system may perform statistical analysis on multiple frames and across multiple shots in a given visual production. For example, in some embodiments, the system may perform statistical analysis of the data across the range of frames in the shot. The system may also condense the per-element data (e.g., barrel 1, barrel 2, barrel 3, etc.) down to the unique asset (barrel).

In various embodiments, the system may collate the results from multiple frames and across multiple shots in a given visual production. For example, in some embodiments, the system may store and collate with data multiple shots in a database, which can be made available via other systems for a variety of tasks. In some embodiments, the asset detail level may be made available to and facilitate production managers in deciding how much effort to put into a given asset (e.g., target object).

In various embodiments, the system may assemble lists of assets or target objects visible in each shot. This facilitates production schedule work on those assets in such a way as to free downstream departments to commence work as early as possible. In various embodiments, the system collates information from many shots as part of the production planning. For example, the system may process over 100 shots and then identify the most commonly seen assets. In another example, the system may determine the least costly assets to create, and the system may prioritize work on those assets.

In various embodiments, the system may facilitate production managers, technicians, etc. in designing layouts by helping choose an appropriate target object (or version of the target object) that is neither too expensive to render in the background nor too simple to be used in the foreground.

In various embodiments, the system may identify when to modify a layout and/or camera as needed, such as when a completed asset is to be used outside its build specifications.

In various embodiments, the system may combine the asset detail level of a given target object with image sequence information (ISI) data to selectively load and inspect portions of the 3D scene from a 2D movie. In various embodiments, an ISI data is used by image/movie review tools, which allow a user to point and click on an object in the image and see additional information about that image (e.g., name; ID; variants such as "redshirt," "stripedshirt," etc.; and/or other data as determined and populated by the system).

In various embodiments, the system has one asset (e.g., one barrel asset) that is used multiple times across the frames. For example, target object 102 may be a barrel asset that is used for different barrels (e.g., barrels 25, 27, 32, etc.) in different shots, including different shots in different visual productions.

In various embodiments, the system may have information for each of the barrels, collate the information, and store the information under one unique asset. In this example, target object 102 may be referred to as the barrel asset that may be reused at different distances and angles in different frames. As such, target object 102 may be used at the position of target object 102', at the position of target object 102", etc.

This provides the maximum size that the barrel asset will ever show up (e.g., target object 102"), the minimum size that the barrel asset will ever show up (e.g., target object 102'), and an average size that the barrel asset will ever show up (e.g., target object 102).

In various embodiments, the system uses the maximum and minimum sizes to predict future sizes in future frames yet to be determined. For example, maximum and minimum size of target object 102 may be ascertained at some point during preproduction, and either or both of maximum and minimum size of target object 102 may change at any point during preproduction or during postproduction. In various embodiments, the system iteratively adjusts such maximum and minimum sizes accordingly, as the system comes into possession of new data from new cameras, new sequences, etc. In an example scenario, a camera may be subsequently adjusted to make a given target object appear at a much closer distance. As such, the system may update the maximum size of the target object.

While some embodiments are described in the context of the size of the target object, these embodiments and others may also apply to other aspects of the asset. Such aspects may include a depth number (e.g., distance from a camera), texture, color, etc.

As indicated herein, when a given set for a visual production is created, there may be thousands or even tens of thousands of objects in a given scene/set and related frames. The layout may change with new dressing such as trees, shrubs, animals, etc.

In some embodiments, the same target object (e.g., barrel asset) may have different traits or variances in details (e.g., color, texture, etc.). As such, the same asset may be used for a red barrel, a blue barrel, etc.

Such variances may also include wardrobe. For example, a given person may not be wearing glasses and a hat in one scene and may be wearing glasses and a hat in a subsequent scene. In various embodiments, the system may identify and track each of these wardrobe accessories as individual, separate assets.

In various embodiments, the system continuously aggregates the information over the time of the production as new information is learned. The system updates this information in a database.

In various embodiments, the system may inform management when changes to aggregate information are learned about, as in when a new maximum or minimum size is learned about and the new size exceeds the asset's build specification. In various embodiments, the system may send a message to production indicating a layout or camera that causes an asset to fall outside the specification for which production has planned and budgeted.

In some embodiments, the system may model and render a given object from different distances, perspectives, etc., as would be seen in a movie. This may help production managers to make decisions based on viewed objects with particular levels of detail.

In some embodiments, the system may provide a user interface to display information generated herein (e.g., asset detail level, example rendered objects in images, etc.) to a user.

In some embodiments, the system may utilize or augment an existing display or in-house renderer with additional information generated herein, (e.g., color coding the objects to convey information.) In some embodiments, the system may utilize an openGL shader in an existing display to statically color code objects, or to dynamically color code objects according to a comparison between predetermined asset detail level and current placement of the object (e.g., make the object red if it is too close to camera, etc.).

Embodiments described herein may be plugged directly into in-house renderers to reduce the need to run special processes to generate data. Embodiments may account for requested specifications or actual specifications.

Embodiments described herein provide various benefits. For example, instead of culling a fully built animation scene with the highest detail level, the system determines what asset detail level is needed in parts of the scene for animators and informs animators in advance.

Figure 3:
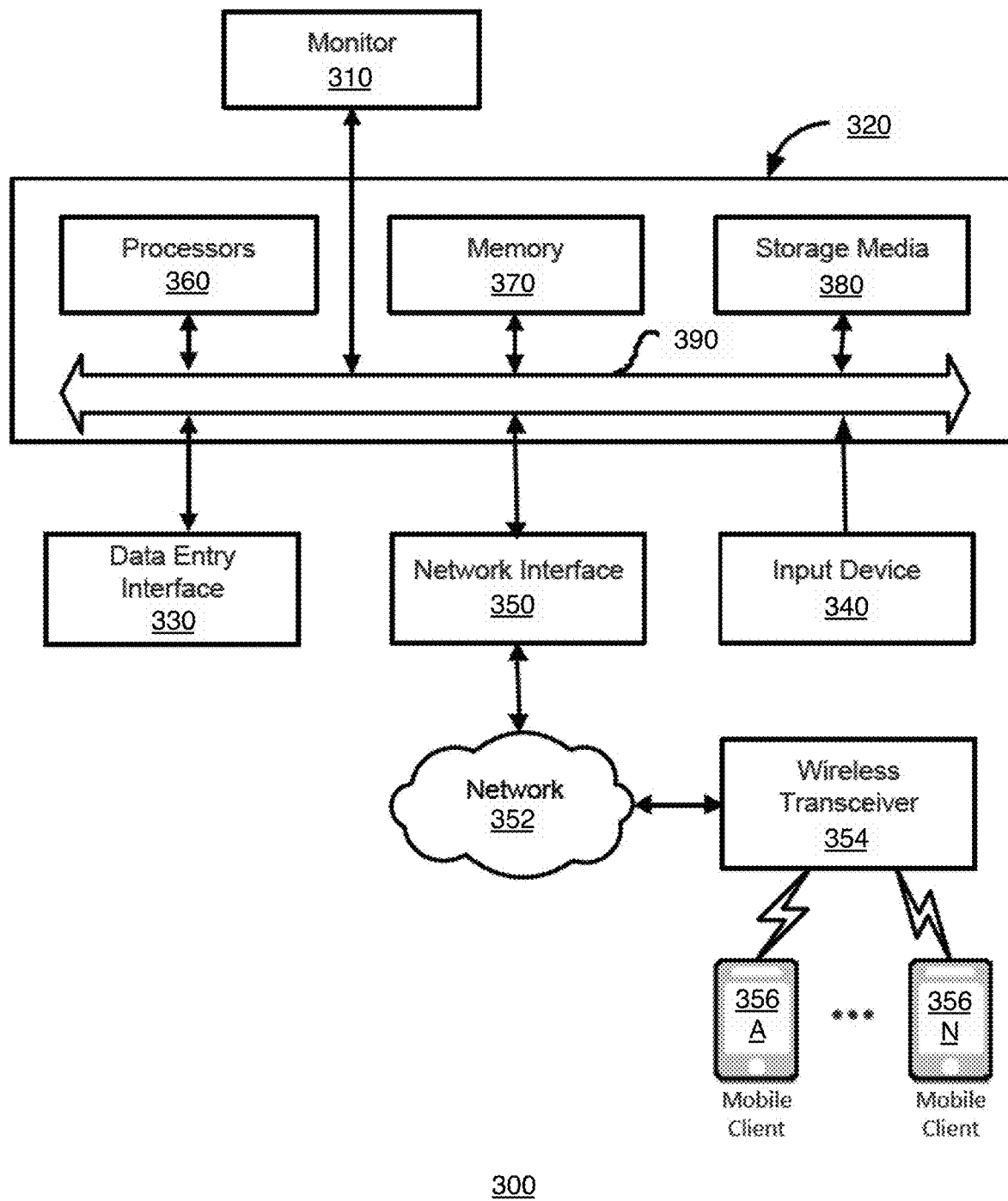
FIG. 3 shows basic components of an example computer system suitable for use with embodiments described herein.

FIG. 3 is a block diagram of an exemplary computer system 300 for use with implementations described herein. Computer system 300 is merely illustrative and not intended to limit the scope of the claims. One of ordinary skill in the art would recognize other variations, modifications, and alternatives. For example, computer system 300 may be implemented in a distributed client-server configuration having one or more client devices in communication with one or more server systems.

In one exemplary implementation, computer system 300 includes a display device such as a monitor 310, computer 320, a data entry interface 330 such as a keyboard, touch device, and the like, a user input device 340, a network communication interface 350, and the like. User input device 340 is typically embodied as a computer mouse, a trackball, a track pad, wireless remote, tablet, touch screen, and the like. Moreover, user input device 340 typically allows a user to select and operate objects, icons, text, characters, and the like that appear, for example, on the monitor 310.

Network interface 350 typically includes an Ethernet card, a modem (telephone, satellite, cable, ISDN), (asynchronous) digital subscriber line (DSL) unit, and the like. Further, network interface 350 may be physically integrated on the motherboard of computer 320, may be a software program, such as soft DSL, or the like.

Computer system 300 may also include software that enables communications over communication network 352 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 352 may include a local area network, a wide area network, a wireless network, an Intranet, the Internet, a private network, a public network, a switched network, or any other suitable communication network, such as for example Cloud networks. Communication network 352 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 352 may communicate to one or more mobile wireless devices 356A-N, such as mobile phones, tablets, and the like, via a base station such as wireless transceiver 354.

Computer 320 typically includes familiar computer components such as a processor 360, and memory storage devices, such as a memory 370, e.g., random access memory (RAM), storage media 380, and system bus 390 interconnecting the above components. In one embodiment, computer 320 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 370 and Storage media 380 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

Figure 4:
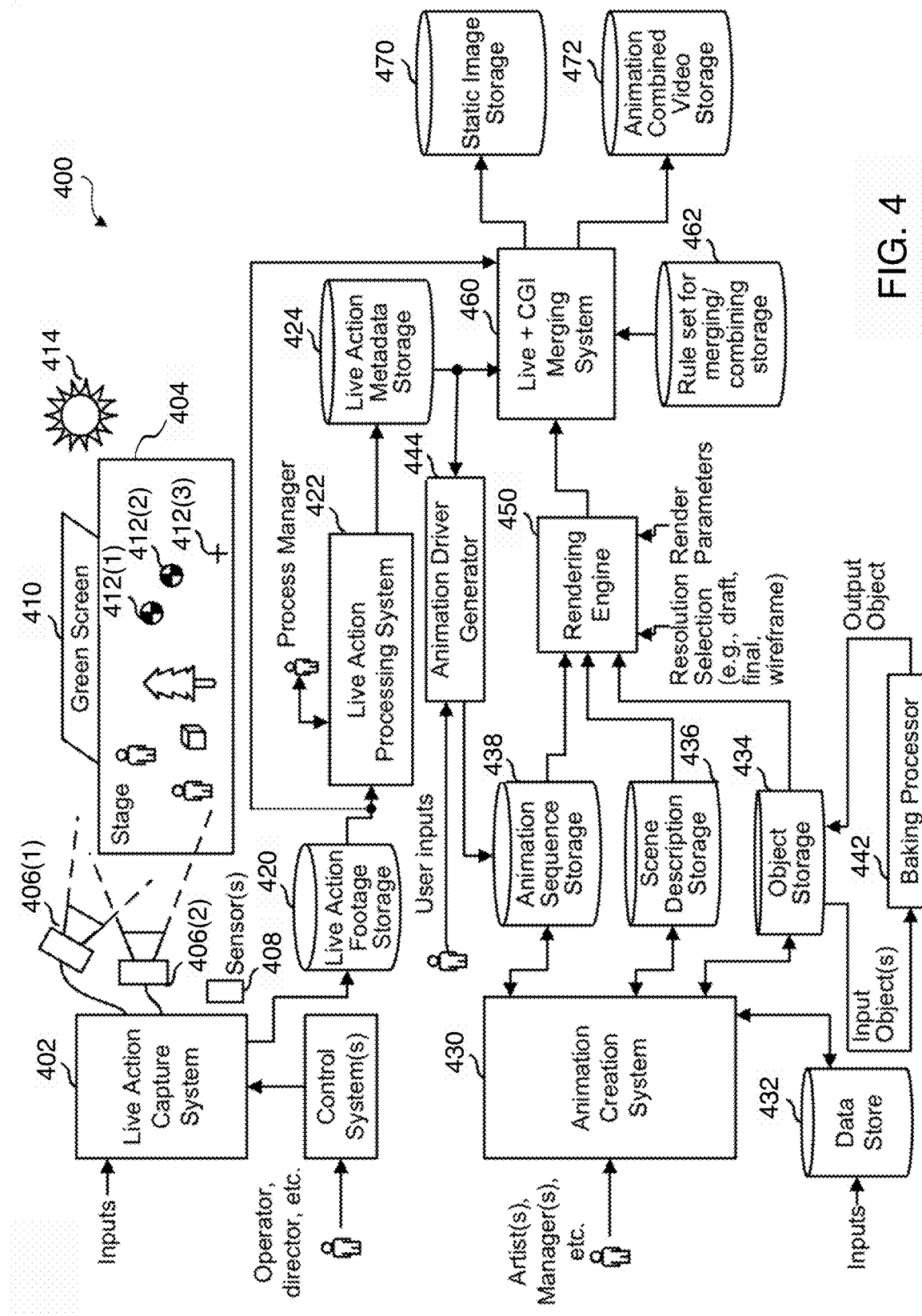
FIG. 4 is an block diagram of an example visual content generation system, which may be used to generate imagery in the form of still images and/or video sequences of images, according to some embodiments.

FIG. 4 is an block diagram of an example visual content generation system 400, which may be used to generate imagery in the form of still images and/or video sequences of images, according to some embodiments. The visual content generation system 400 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 400 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 400 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated. In the example, a ray defined by the camera viewpoint in the scene space and a given pixel in that grid first intersects a solid, opaque, blue object, that given pixel is assigned the color blue. Of course, for modern computer-generated imagery, determining pixel colors, and thereby generating imagery, can be more complicated, as there are lighting issues, reflections, interpolations, and other considerations.

In various embodiments, a live action capture system 402 captures a live scene that plays out on a stage 404. The live action capture system 402 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 406(1) and 406(2) capture the scene, while in some systems, there might be other sensor(s) 408 that capture information from the live scene (e.g., infrared cameras, infrared sensors, motion capture ("mo-cap") detectors, etc.). On the stage 404, there might be human actors, animal actors, inanimate objects, background objects, and possibly an object such as a green screen 410 that is designed to be captured in a live scene recording in such a way that it is easily overlaid with computer-generated imagery. The stage 404 might also contain objects that serve as fiducials, such as fiducials 412(1)-(3), that might be used post-capture to determine where an object was during capture. A live action scene might be illuminated by one or more lights, such as an overhead light 414.

During or following the capture of a live action scene, the live action capture system 402 might output live action footage to a live action footage storage 420. A live action processing system 422 might process live action footage to generate data about that live action footage and store that data into a live action metadata storage 424. The live action processing system 422 might include computer processing capabilities, image processing capabilities, one or more processors, program code storage for storing program instructions executable by the one or more processors, as well as user input devices and user output devices, not all of which are shown. The live action processing system 422 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 414, as that might be useful in post-processing to match computer-generated lighting on objects that are computer-generated and overlaid on the live action footage. The live action processing system 422 might operate autonomously, perhaps based on predetermined program instructions, to generate and output the live action metadata upon receiving and inputting the live action footage. The live action footage can be camera-captured data as well as data from other sensors.

An animation creation system 430 is another part of the visual content generation system 400. The animation creation system 430 might include computer processing capabilities, image processing capabilities, one or more processors, program code storage for storing program instructions executable by the one or more processors, as well as user input devices and user output devices, not all of which are shown. The animation creation system 430 might be used by animation artists, managers, and others to specify details, perhaps programmatically and/or interactively, of imagery to be generated. From user input and data from a database or other data source, indicated as a data store 432, the animation creation system 430 might generate and output data representing objects (e.g., a horse, a human, a ball, a teapot, a cloud, a light source, a texture, etc.) to an object storage 434, generate and output data representing a scene into a scene description storage 436, and/or generate and output data representing animation sequences to an animation sequence storage 438.

Scene data might indicate locations of objects and other visual elements, values of their parameters, lighting, camera location, camera view plane, and other details that a rendering engine 450 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 430 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 434 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 432 might be used to drive object presentation. For example, if an artist is creating an animation of a spaceship passing over the surface of the Earth, instead of manually drawing or specifying a coastline, the artist might specify that the animation creation system 430 is to read data from the data store 432 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 444 might read in live action metadata, such as data representing movements and positions of body parts of a live actor during a live action scene, and generate corresponding animation parameters to be stored in the animation sequence storage 438 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 422. The animation driver generator 444 might convert that movement data into specifications of how joints of an articulated CGI character are to move over time.

A rendering engine 450 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 450 might include computer processing capabilities, image processing capabilities, one or more processors, program code storage for storing program instructions executable by the one or more processors, as well as user input devices and user output devices, not all of which are shown.

The visual content generation system 400 can also include a merging system 460 (labeled "Live+CGI Merging System") that merges live footage with animated content. The live footage might be obtained and input by reading from the live action footage storage 420 to obtain live action footage, by reading from the live action metadata storage 424 to obtain details such as presumed segmentation in captured images segmenting objects in a live action scene from their background (perhaps aided by the fact that the green screen 410 was part of the live action scene), and by obtaining CGI imagery from the rendering engine 450.

A merging system 460 might also read data from rule sets for merging/combining storage 462. A very simple example of a rule in a rule set might be "obtain a full image including a two-dimensional pixel array from live footage, obtain a full image including a two-dimensional pixel array from the rendering engine 450, and output an image where each pixel is a corresponding pixel from the rendering engine 450 when the corresponding pixel in the live footage is a specific color of green, otherwise output a pixel value from the corresponding pixel in the live footage."

The merging system 460 might include computer processing capabilities, image processing capabilities, one or more processors, program code storage for storing program instructions executable by the one or more processors, as well as user input devices and user output devices, not all of which are shown. The merging system 460 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 460, such as modifying boundaries of segmented objects, inserting blurs to smooth out imperfections, or adding other effects. Based on its inputs, the merging system 460 can output an image to be stored in a static image storage 470 and/or a sequence of images in the form of video to be stored in an animated/combined video storage 472.

Thus, as described, the visual content generation system 400 can be used to generate video that combines live action with computer-generated animation using various components and tools, some of which are described in more detail herein. While the visual content generation system 400 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 5:
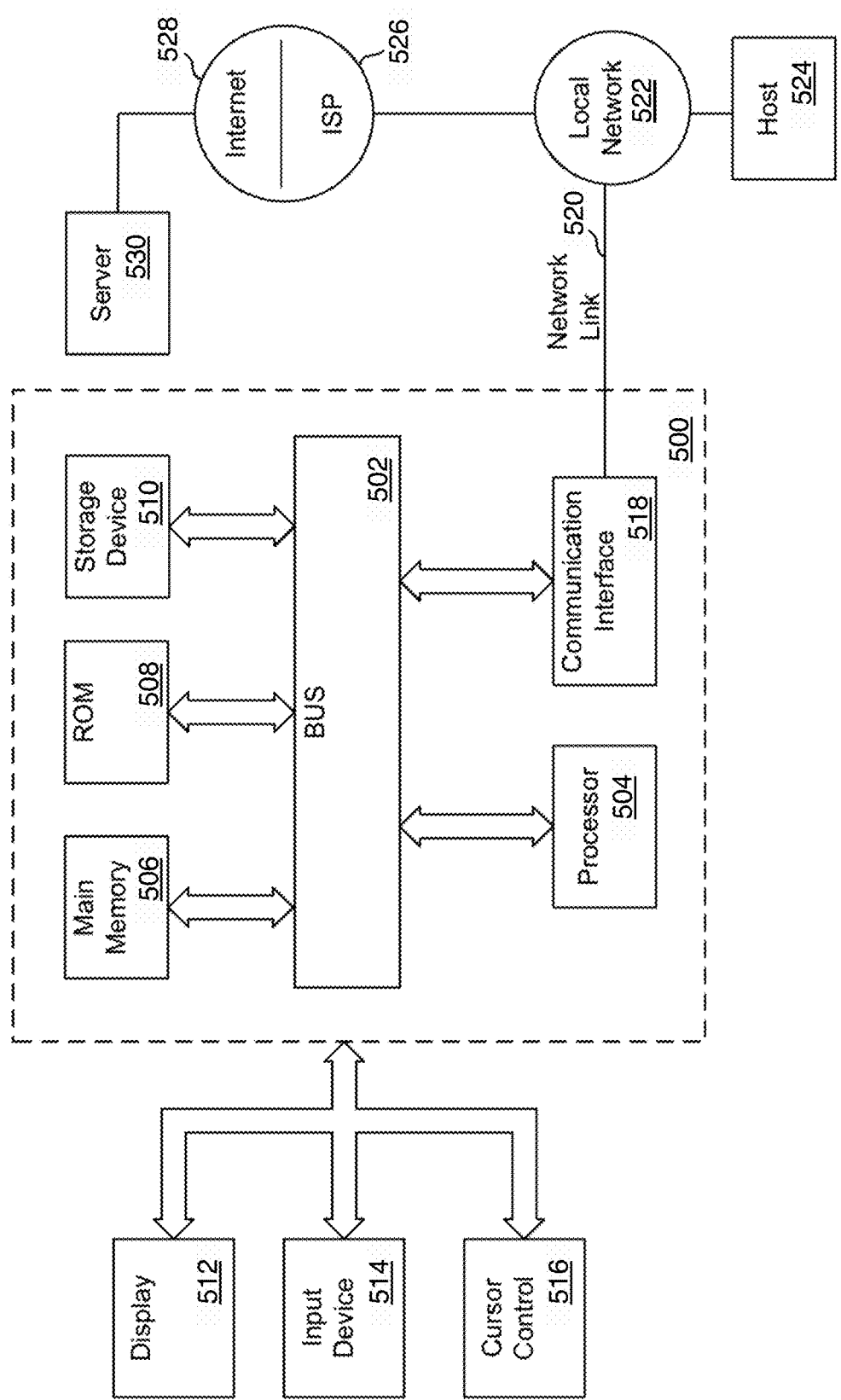
FIG. 5 is a block diagram of an example computer system, which may be used for embodiments described herein.

FIG. 5 is a block diagram of an example computer system 500, which may be used for embodiments described herein. The computer system 500 includes a bus 502 or other communication mechanism for communicating information, and a processor 504 coupled with the bus 502 for processing information. The processor 504 may be, for example, a general purpose microprocessor.

The computer system 500 also includes a main memory 506, such as a random access memory (RAM) or other dynamic storage device, coupled to the bus 502 for storing information and instructions to be executed by the processor 504. The main memory 506 may also be used for storing temporary variables or other intermediate information during execution of instructions to be executed by the processor 504. Such instructions, when stored in non-transitory storage media accessible to the processor 504, render the computer system 500 into a special-purpose machine that is customized to perform the operations specified in the instructions.

The computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

The computer system 500 may be coupled via the bus 502 to a display 512, such as a computer monitor, for displaying information to a computer user. An input device 514, including alphanumeric and other keys, is coupled to the bus 502 for communicating information and command selections to the processor 504. Another type of user input device is a cursor control 516, such as a mouse, a trackball, or cursor direction keys for communicating direction information and command selections to the processor 504 and for controlling cursor movement on the display 512. This input device 514 typically has two degrees of freedom in two axes, a first axis (e.g., x) and a second axis (e.g., y), that allows the input device 514 to specify positions in a plane.

The computer system 500 may implement the techniques described herein using customized hard-wired logic, one or more ASICs or FPGAs, firmware, and/or program logic which, in combination with the computer system, causes or programs the computer system 500 to be a special-purpose machine. According to one embodiment, the techniques herein are performed by the computer system 500 in response to the processor 504 executing one or more sequences of one or more instructions contained in the main memory 506. Such instructions may be read into the main memory 506 from another storage medium, such as the storage device 510. Execution of the sequences of instructions contained in the main memory 506 causes the processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 510. Volatile media includes dynamic memory, such as the main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 502. Transmission media can also take the form of acoustic or light waves, such as those generated during radio-wave and infrared data communications.

Various forms of media may be involved in carrying one or more sequences of one or more instructions to the processor 504 for execution. For example, the instructions may initially be carried on a magnetic disk or solid state drive of a remote computer. The remote computer can load the instructions into its dynamic memory and send the instructions over a network connection. A modem or network interface local to the computer system 500 can receive the data. The bus 502 carries the data to the main memory 506, from which the processor 504 retrieves and executes the instructions. The instructions received by the main memory 506 may optionally be stored on the storage device 510 either before or after execution by the processor 504.

The computer system 500 also includes a communication interface 518 coupled to the bus 502. The communication interface 518 provides a two-way data communication coupling to a network link 520 that is connected to a local network 522. For example, the communication interface 518 may be an integrated services digital network ("ISDN") card, cable modem, satellite modem, or a modem to provide a data communication connection to a corresponding type of telephone line. Wireless links may also be implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 may provide a connection through a local network 522 to a host computer 524 or to data equipment operated by an Internet Service Provider ("ISP") 526. The ISP 526 in turn provides data communication services through the world wide packet data communication network now commonly referred to as the "Internet" 528. The local network 522 and the Internet 528 both use electrical, electromagnetic, or optical signals that carry digital data streams. The signals through the various networks and the signals on the network link 520 and through the communication interface 518, which carry the digital data to and from the computer system 500, are example forms of transmission media.

The computer system 500 can send messages and receive data, including program code, through the network(s), the network link 520, and the communication interface 518. In the Internet example, a server 530 might transmit a requested code for an application program through the Internet 528, the ISP 526, the local network 522, and the communication interface 518. The received code may be executed by the processor 504 as it is received, and/or stored in the storage device 510, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 500) configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program including a plurality of instructions executable by one or more processors. The computer-readable storage medium may be non-transitory.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments are implemented as a non-transitory processor-readable medium including instructions executable by one or more digital processors. The processor-readable medium comprising one or more instructions executable by the one or more digital processors for implementing embodiments described herein.

Some embodiments are implemented as processor implementable code provided on a computer-readable medium. The computer-readable medium may comprise a non-transient storage medium, such as solid-state memory, a magnetic disk, optical disk, etc., or a transient medium such as a signal transmitted over a computer network.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer-implemented method performed by one or more digital processors for multi-angle screen coverage analysis, the method comprising:

obtaining at least one image, wherein the at least one image is a computer graphics generated image, and wherein the at least one image comprises at least one target object;

determining screen coverage information for the at least one target object;

determining depth information for the at least one target object, wherein the depth information comprises a distance between the at least one target object and at least one camera;

determining an asset detail level for the at least one target object based on the screen coverage information and the depth information;

generating an asset data set associated with the at least one target object, wherein the asset data set comprises a model of the at least one target object, the depth information, and the asset detail level;

storing the asset data set in a database for subsequent reuse of the asset data set in a visual production;

aggregating new information associated with the at least one target object over a time of the visual production;

iteratively updating the asset data set in the database;

retrieving the asset data set from the database; and rendering the at least one target object based on the asset data set.

2. The method of claim 1, further comprising rendering the at least one target object at one or more of different distances or angles in different frames of the visual production.

3. The method of claim 1, wherein the screen coverage information is based on a percentage of a screen that is covered by the at least one target object.

4. The method of claim 1, wherein the screen coverage information is based on an absolute portion of a screen that is covered by the at least one target object.

5. The method of claim 1, wherein the at least one image comprises a plurality of objects, wherein the plurality of objects comprises the at least one target object, and wherein the depth information for the at least one target object is based on at least one other object of the plurality of objects.

6. The method of claim 1, further comprising providing the asset detail level to one or more users.

7. The method of claim 1, wherein in the asset detail level comprises an amount of image detail.

8. The method of claim 1, wherein the asset detail level comprises an image resolution.

9. An apparatus for multi-angle screen coverage analysis, the apparatus comprising:
   one or more processors; and
   logic encoded in one or more tangible media for execution by the one or more processors for:
      obtaining at least one image, wherein the at least one image is a computer graphics generated image, and wherein the at least one image comprises at least one target object;
      determining screen coverage information for the at least one target object;
      determining depth information for the at least one target object, wherein the depth information comprises a distance between the at least one target object and at least one camera;
      determining an asset detail level for the at least one target object based on the screen coverage information and the depth information;
      generating an asset data set associated with the at least one target object, wherein the asset data set comprises a model of the at least one target object, the depth information, and the asset detail level;
      storing the asset data set in a database for subsequent reuse of the asset data set in a visual production;
      aggregating new information associated with the at least one target object over a time of the visual production;
      iteratively updating the asset data set in the database;
      retrieving the asset data set from the database; and
      rendering the at least one target object based on the asset data set.

10. The apparatus of claim 9, wherein the at least one target object is at least partially visible in the at least one image.

11. The apparatus of claim 9, wherein the at least one target object is fully visible in the at least one image.

12. The apparatus of claim 9, wherein the screen coverage information is based on a percentage of a screen that is covered by the at least one target object.

13. The apparatus of claim 9, wherein the screen coverage information is based on an absolute portion of a screen that is covered by the at least one target object.

14. The apparatus of claim 9, wherein the at least one image comprises a plurality of objects, wherein the plurality of objects comprises the at least one target object, and wherein the depth information for the at least one target object is based on at least one other object of the plurality of objects.

15. The apparatus of claim 9, wherein the logic when executed is further operable to cause the one or more processors to perform operations comprising providing the asset detail level to one or more users.

16. The apparatus of claim 9, wherein in the asset detail level comprises an amount of image detail.

17. The apparatus of claim 9, wherein the asset detail level comprises an image resolution.

18. A non-transitory computer-readable storage medium with program instructions stored thereon, the program instructions when executed by one or more processors are operable to cause the one or more processors to perform operations comprising:
   obtaining at least one image, wherein the at least one image is a computer graphics generated image, and wherein the at least one image comprises at least one target object;
   determining screen coverage information for the at least one target object;
   determining depth information for the at least one target object, wherein the depth information comprises a distance between the at least one target object and at least one camera;
   determining an asset detail level for the at least one target object based on the screen coverage information and the depth information;
   generating an asset data set associated with the at least one target object, wherein the asset data set comprises a model of the at least one target object, the depth information, and the asset detail level;
   storing the asset data set in a database for subsequent reuse of the asset data set in a visual production;
   aggregating new information associated with the at least one target object over a time of the visual production;
   iteratively updating the asset data set in the database;
   retrieving the asset data set from the database; and
   rendering the at least one target object based on the asset data set.

19. The computer-readable storage medium of claim 18, wherein the at least one target object is at least partially visible in the at least one image.

* * * * *